(12) United States Patent
Bannister

(10) Patent No.: US 11,042,698 B2
(45) Date of Patent: Jun. 22, 2021

(54) SYSTEM AND METHOD OF CONTEXTUALLY CONVERTING A MEDIA FILE INTO AN ELECTRONIC DOCUMENT

(71) Applicant: Paul Bannister, Encinitas, CA (US)

(72) Inventor: Paul Bannister, Encinitas, CA (US)

( * ) Notice: Subject to any disclaimer, the term of this patent is extended or adjusted under 35 U.S.C. 154(b) by 50 days.

(21) Appl. No.: 16/547,917

(22) Filed: Aug. 22, 2019

(65) Prior Publication Data

US 2021/0056165 A1 Feb. 25, 2021

(51) Int. Cl.

| | |
|---|---|
| *G06F 40/103* | (2020.01) |
| *G06F 40/186* | (2020.01) |
| *H04L 29/08* | (2006.01) |
| *H04L 29/06* | (2006.01) |
| *G06K 9/00* | (2006.01) |
| *G10L 15/30* | (2013.01) |
| *G06F 3/0482* | (2013.01) |
| *G10L 15/18* | (2013.01) |
| *G10L 15/22* | (2006.01) |

(Continued)

(52) U.S. Cl.
CPC .......... *G06F 40/186* (2020.01); *G06F 3/0482* (2013.01); *G06F 40/103* (2020.01); *G06F 40/134* (2020.01); *G06F 40/169* (2020.01); *G06K 9/00744* (2013.01); *G06K 9/00758* (2013.01); *G06K 9/00765* (2013.01); *G10L 15/1822* (2013.01); *G10L 15/22* (2013.01); *G10L 15/30* (2013.01); *H04L 67/06* (2013.01); *H04L 67/306* (2013.01); *H04L 67/42* (2013.01)

(58) Field of Classification Search
CPC .... G06F 40/186; G06F 40/134; G06F 40/103; G06F 40/169; G06F 3/0482; G06K 9/04744; G06K 9/00758; G06K 9/00765; G10L 15/822; G10L 15/22; G10L 15/30; H04L 67/06; H04L 67/306; H04L 67/42
USPC ........................................................ 715/202
See application file for complete search history.

(56) References Cited

U.S. PATENT DOCUMENTS

| | | |
|---|---|---|
| 5,099,322 A | 3/1992 | Gove |
| 5,459,517 A | 10/1995 | Kunitake et al. |
| 7,647,555 B1 | 1/2010 | Wilcox et al. |

(Continued)

OTHER PUBLICATIONS

Aubert et al., Advene: An Active Reading through Hypervideo, ACM 2005, p. 235—244. (Year: 2005).*

(Continued)

*Primary Examiner* — Alvin H Tan

(57) ABSTRACT

A system and method of contextually converting a media file into an electronic document allows the user to generate an interactive transcription from the audio portion of a provided media file, which subsequently connects to the media file such that the user can play the media file from a selected transcribed word. Screenshots from video files may also be appended to the electronic document at transitions in video content and subsequently matched to appropriate transcribed words within the generated document. The system implementing the method includes a user account managed by at least one remote server, wherein the user account is associated with a corresponding personal computing (PC) device. This arrangement enables each user to interact with the at least one remote server using the corresponding PC device. The method follows an overall process in order to generate an electronic document with timestamped transcriptions.

17 Claims, 20 Drawing Sheets

(51) Int. Cl.
*G06F 40/134* (2020.01)
*G06F 40/169* (2020.01)

(56) References Cited

U.S. PATENT DOCUMENTS

| | | | |
|---|---|---|---|
| 7,825,963 B2 | 11/2010 | Abdellaziz Trimeche et al. | |
| 8,891,939 B2 | 11/2014 | Alexandrov et al. | |
| 9,681,073 B1* | 6/2017 | Jin | H04N 5/357 |
| 9,736,262 B2* | 8/2017 | Yanagihara | H04L 67/2842 |
| 10,432,864 B1* | 10/2019 | Douady | H04N 5/2328 |
| 2012/0317492 A1* | 12/2012 | Sheeder | H04N 21/25891 |
| | | | 715/738 |
| 2014/0163707 A1* | 6/2014 | Logan | G06F 16/4387 |
| | | | 700/94 |
| 2015/0180833 A1* | 6/2015 | Snow | G06Q 10/10 |
| | | | 713/155 |
| 2015/0358603 A1* | 12/2015 | Maleki | H04N 13/264 |
| | | | 348/47 |
| 2016/0005281 A1* | 1/2016 | Laska | G08B 13/1961 |
| | | | 348/143 |
| 2016/0275187 A1 | 9/2016 | Chowdhury et al. | |
| 2018/0081503 A1* | 3/2018 | Green | G06N 3/084 |
| 2019/0373330 A1* | 12/2019 | Bloch | H04N 21/25891 |
| 2020/0334373 A1* | 10/2020 | von Muhlen | G06F 21/6218 |

OTHER PUBLICATIONS

"Timestamps", Speechpad (https://www.speechpad.com/transcription/timestamps).
"How to take a video screenshot", Movavi, (https://www.movavi.com/support/how-to/how-to-take-video-screenshots.html).
"Geography shouldn't dictate how people make a living", Rev.com (https://www.rev.com/about).
Decker, "Scene by Scene Script Generation for Live Action Hollywood Movies", (https://www2.stetson.edu/mathcs/wp-content/uploads/2017/08/cdecker-final.pdf).

* cited by examiner

US 11,042,698 B2

SYSTEM AND METHOD OF CONTEXTUALLY CONVERTING A MEDIA FILE INTO AN ELECTRONIC DOCUMENT

FIELD OF THE INVENTION

The present invention generally relates to automated document transcription from provided media files. More specifically, a method of contextually converting a media file into an electronic document allows the user to generate an interactive transcription from the audio portion of a provided media file which then connects to the media file such that the user can play the media file from a selected transcribed word. Screenshots from video files are also appended to the electronic document at transitions in video content, matching the screenshots to appropriate transcribed words within the generated document.

BACKGROUND OF THE INVENTION

Most modern industries rely more heavily than ever on electronic communication mechanisms. Electronic documents, such as portable document formats (PDFs), electronic publications, website pages, and more, avoid the environmental and logistical pitfalls associated with handling and communicating with physical documents. Electronic documents provide capabilities beyond those offered by printing methods. Such documents provide easy and convenient mechanisms for editing and interacting with content. While print still has a place in business today, electronic documents can connect to content across the internet, images, and can even connect across different content mediums.

However, many such electronic documents are still limited. Many workplaces attain sufficiently information-dense documents from PDFs, which are equipped to provide textual information; however, even these documents have their limitations. Similarly, while there are documents that can automatically generate text from audio files and sources, these documents do not interact with the initial content. Further, such systems fail to integrate video and images into a combined document. What is needed is a mechanism for presenting the audio and possibly visual information from a media file into a single document of words and images. More helpful still is the ability for the user to interact with the assembled document to access the media file at appropriate points in the transcription.

The present invention addresses these issues. The present invention accepts a media or multimedia file, such as an audio or video file. The audio portion is transcribed into a readable document format, so that the user can visually navigate the audio content. Each transcribed word or section is given a specific timestamp which refers to the original media or multimedia file. When the user clicks a word, the electronic document connects to the associated timestamp in the uploaded file. If the multimedia file includes a video portion, an image of the video will be captured upon each significant change in screen pixels. The screenshot is appended to the electronic document according to a captured timestamp. Thus, the final document contains several images which are also linked to corresponding timestamps in the originally uploaded multimedia file.

DETAILED DESCRIPTION OF THE INVENTION

All illustrations of the drawings are for the purpose of describing selected versions of the present invention and are not intended to limit the scope of the present invention.

Figure 1:
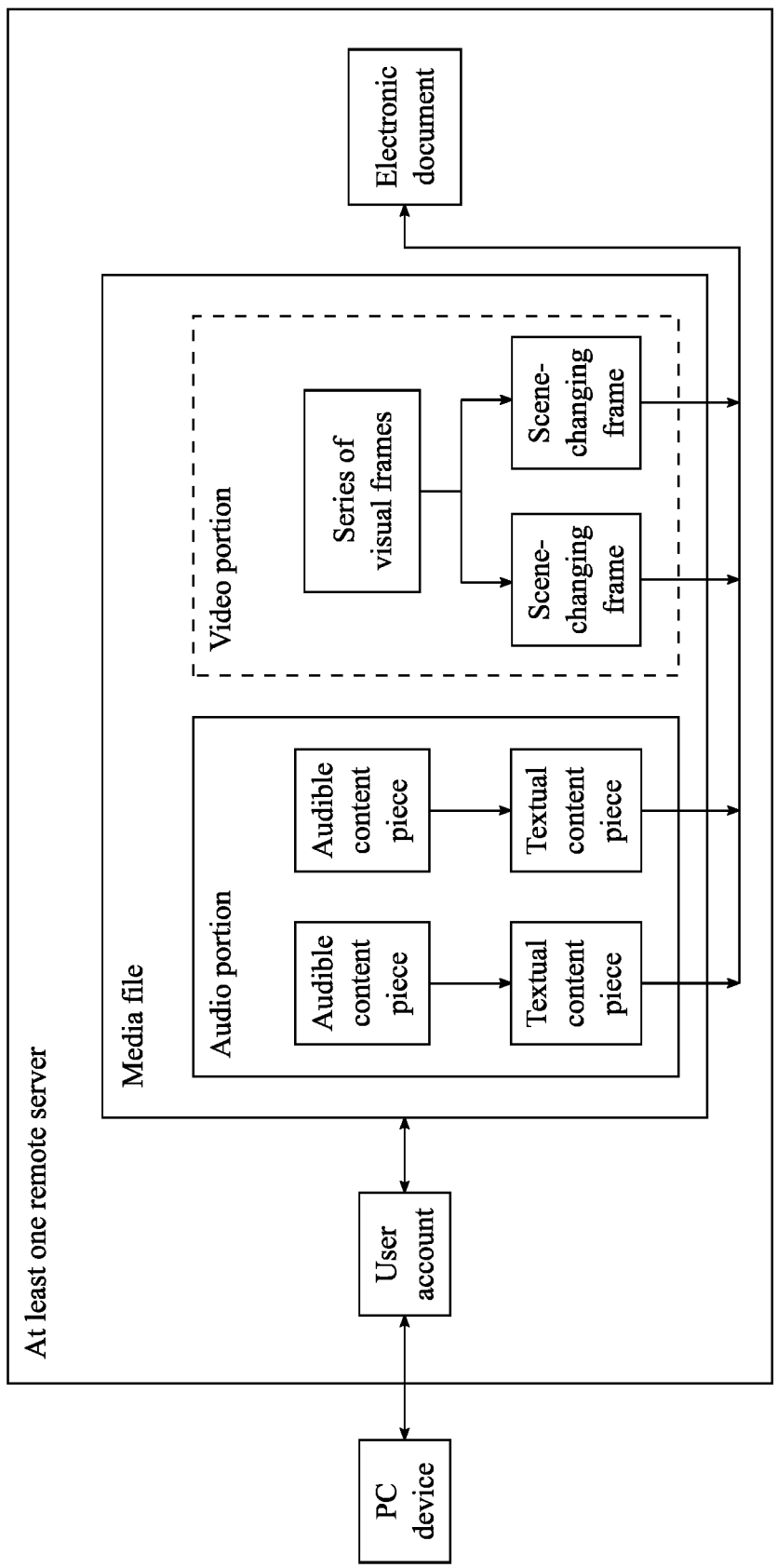
FIG. 1 is a block diagram illustrating the system of the present invention.

The present invention is a system and method of contextually converting a media file into an electronic document that allows the user to generate an interactive transcription from the audio portion of a provided media file, which subsequently connects to the media file such that the user can play the media file from a selected transcribed word. Screenshots from video files may also be appended to the electronic document at transitions in video content and subsequently matched to appropriate transcribed words within the generated document, as represented in FIG. 1. The system of the present invention includes a user account managed by at least one remote server, wherein the user account is associated with a corresponding personal computing (PC) device (Step A). A user account allows the remote server to identify a single user of the present invention and allows the user of the present invention to interact with the at least one remote server in order to manage created content. The at least one remote server is a hub to exchange and process information that is being inputted and outputted from the present invention. The corresponding PC device is any computer, laptop, smartphone, or other such Internet-enabled device that allows the user to communicate with the at least one remote server. This arrangement enables each user to interact with the at least one remote server using the corresponding PC device.

Figure 2:
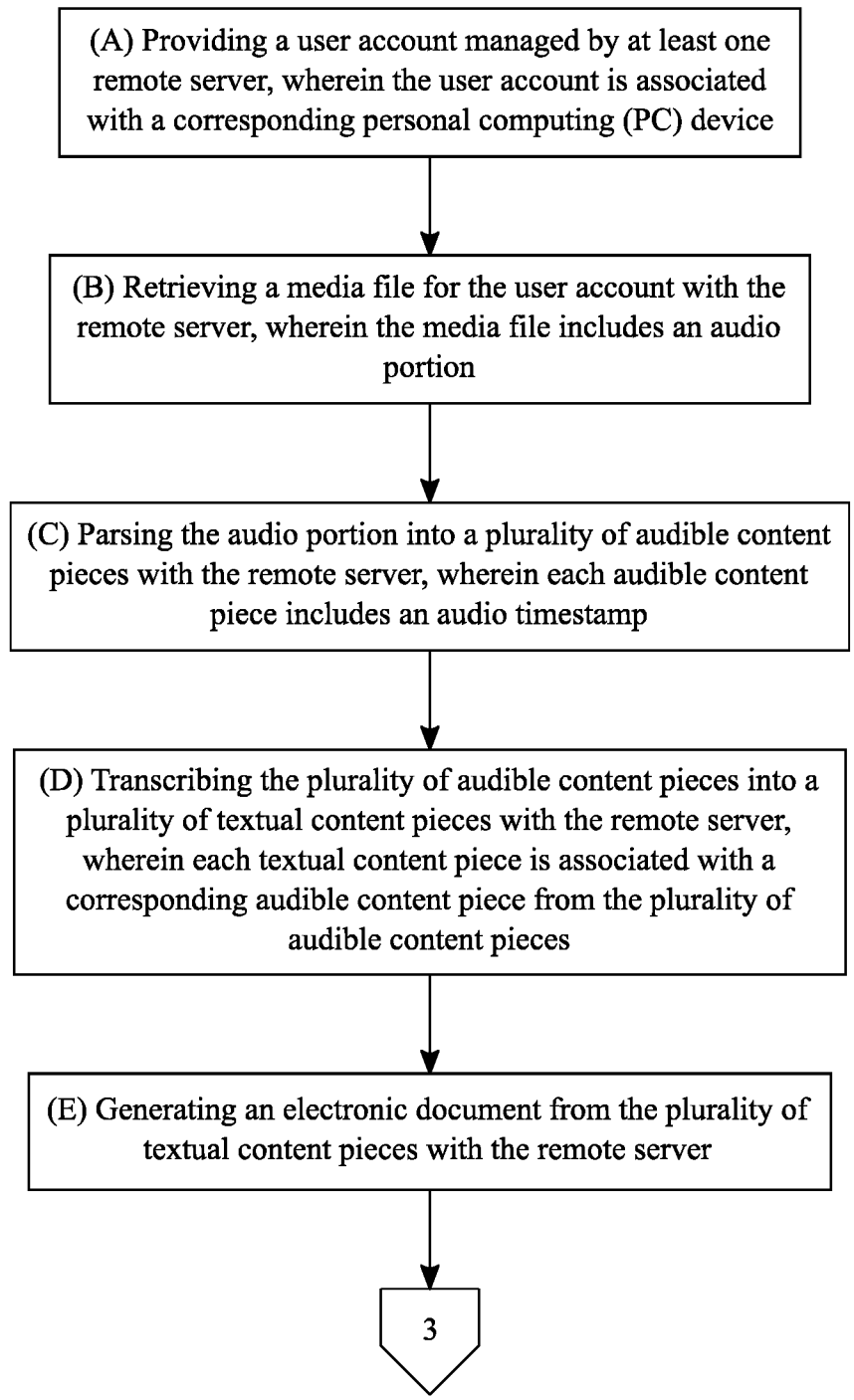
FIG. 2 is a flowchart illustrating the overall process for the method of the present invention.
Figure 3:
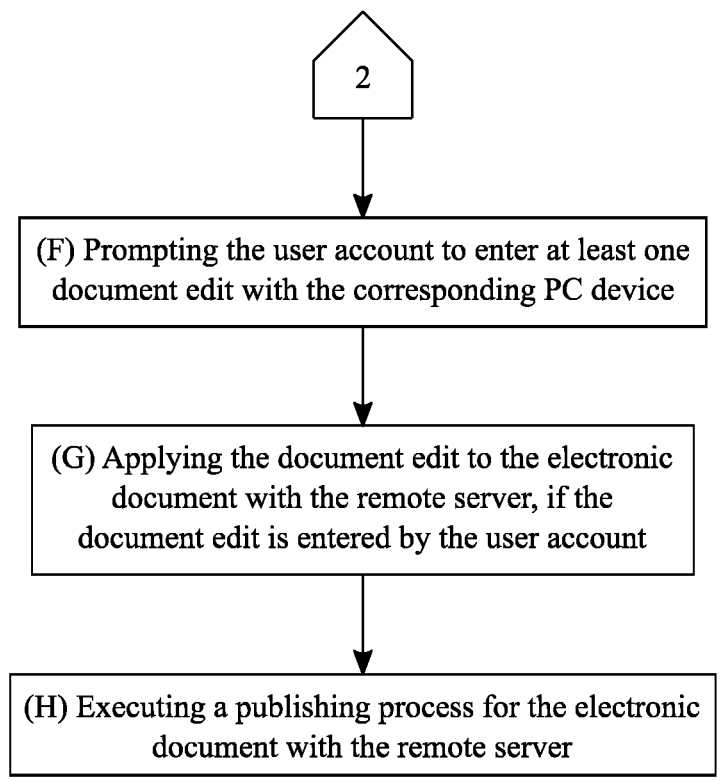
FIG. 3 is a continuation of FIG. 2.

The method of the present invention follows an overall process in order to generate an electronic document with timestamped transcriptions, as represented in FIGS. 2 and 3. The overall process begins by retrieving a media file for the user account with the remote server, wherein the media file includes an audio portion (Step B). The media file may be an audio file or video file in any of a variety of file formats, providing that the media file includes a tracked audio portion. The audio portion relates to the data contained in the media file relating to various captured sounds and noises. Subsequently, the audio portion is parsed into a plurality of audible content pieces with the remote server, wherein each audible content piece includes an audio timestamp (Step C). The plurality of audible content pieces is a set of audio segments from the audio portion that are broken into appropriate length or content pieces for analysis. The audio timestamp is the part of the audio data related to chronological organization of content. The plurality of audible content pieces is next transcribed into a plurality of textual content pieces with the remote server, wherein each textual content piece is associated with a corresponding audible content piece from the plurality of audible content pieces (Step D). The present invention may utilize contextual phrase recognition processes to infer or deduce the plurality of textual content pieces. Similarly, the present invention may utilize individual word recognition to convert spoken words into the plurality of textual content pieces.

The overall process continues by generating an electronic document from the plurality of textual content pieces with the remote server (Step E). The electronic document contains the plurality of textual content pieces positioned in chronological order, thereby resulting in a readable transcription of textual content. Following this, the user account is prompted to enter at least one document edit with the corresponding PC device (Step F). In this way, the user may interact with the electronic document via the document edit, organizing information as the user deems necessary or desirable. The document edit is applied to the electronic document with the remote server, if the document edit is entered by the user account (Step G). The user therefore has direct influence over the organization and presentation of the final version of the electronic document. Finally, a publishing process for the electronic document is executed with the remote server (Step H). The publishing process may be the generation of a distributable document in such a format as to allow the user to interact with the textual content upon the electronic document in order to access appropriate parts of the media file.

Figure 4:
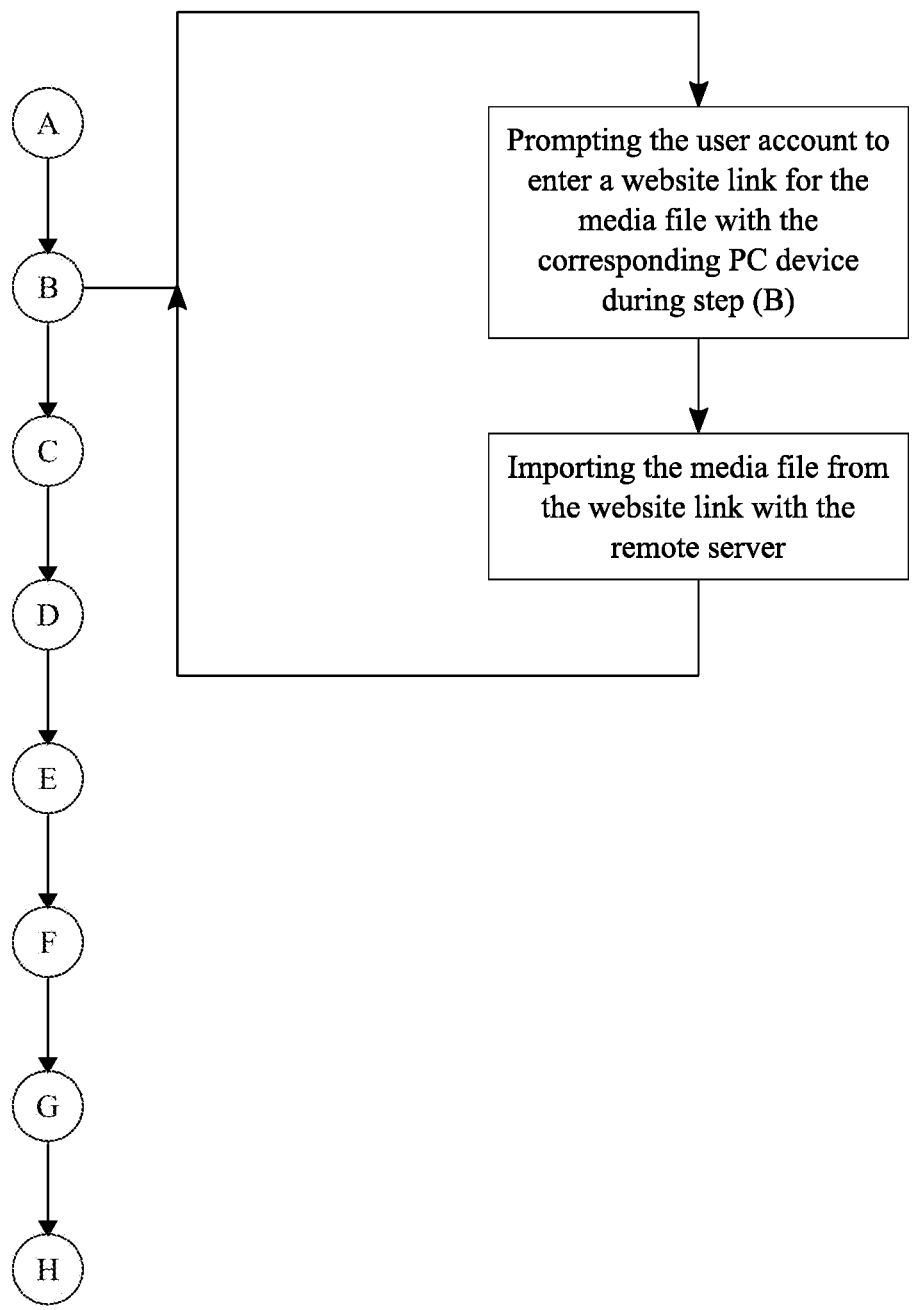
FIG. 4 is a flowchart illustrating the subprocess of uploading a media file from a website link.
Figure 5:
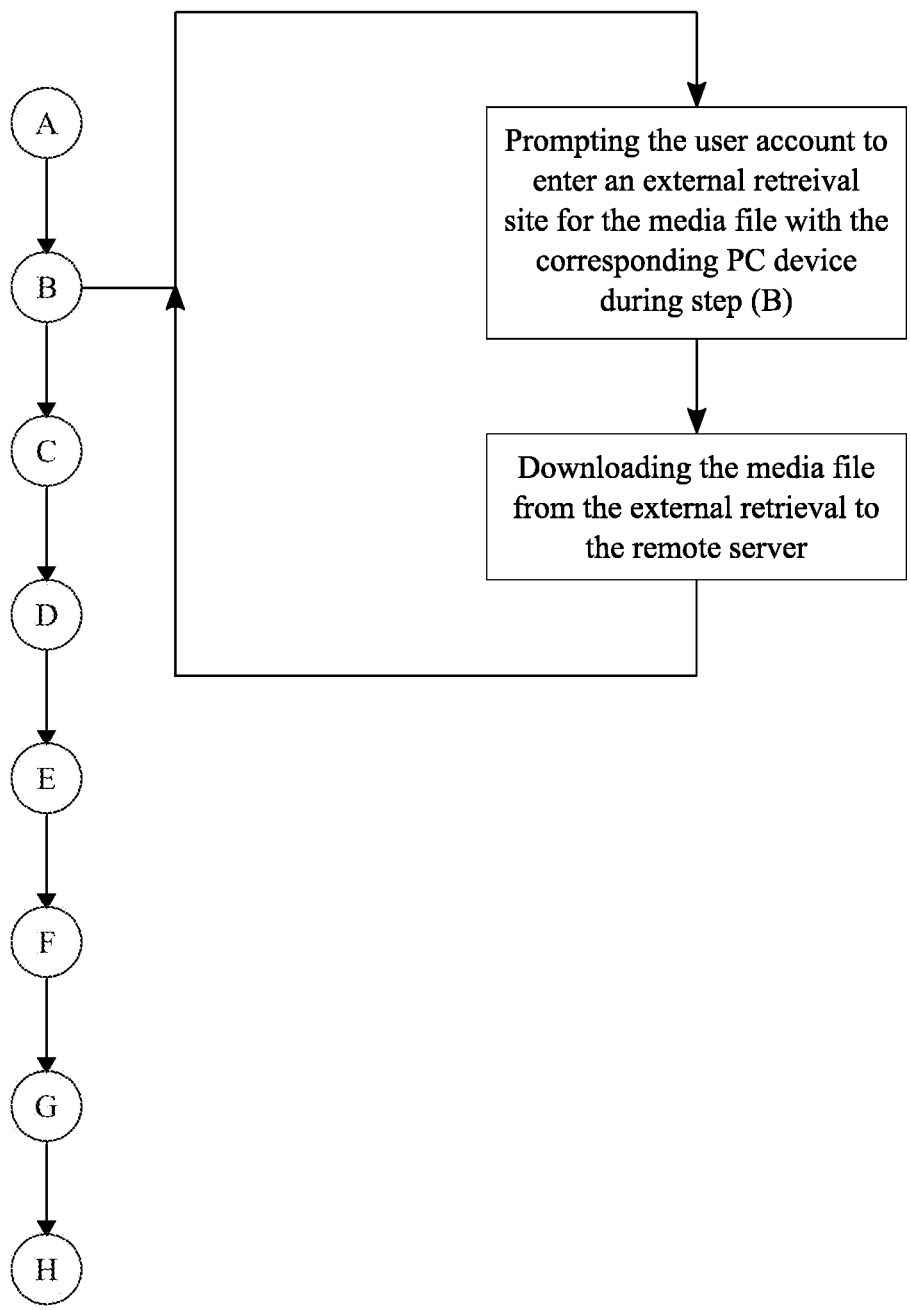
FIG. 5 is a flowchart illustrating the subprocess of uploading a media file from an external retrieval site.

There are a variety of ways in which the user may provide the media file for the user account, including the ability of the user to connect a media file through a hosted online source. To accomplish this, the user account is prompted to enter a website link for the media file with the corresponding PC device during Step B, as represented in FIG. 4. The website link is a set of text that connects the user to specific content on the Internet. The media file is imported from the website link with the remote server. Thus, the remote server gains access to the media file without the user having to directly upload a file through various media. Similarly, the user may desire to provide the media file through the provision of third-party software. To this end, the user account is prompted to enter an external retrieval site for the media file with the corresponding PC device during Step B, as represented in FIG. 5. The external retrieval site can be, but is not limited to, a hard drive on a PC device or a portable hard drive (e.g. a flash drive). Such an arrangement allows the user to upload audio or video files to a site for temporary storage. The media file is downloaded from the external retrieval site to the remote server. In this way, the user has access to multiple different mechanisms by which to provide the media file to the remote server.

Figure 6:
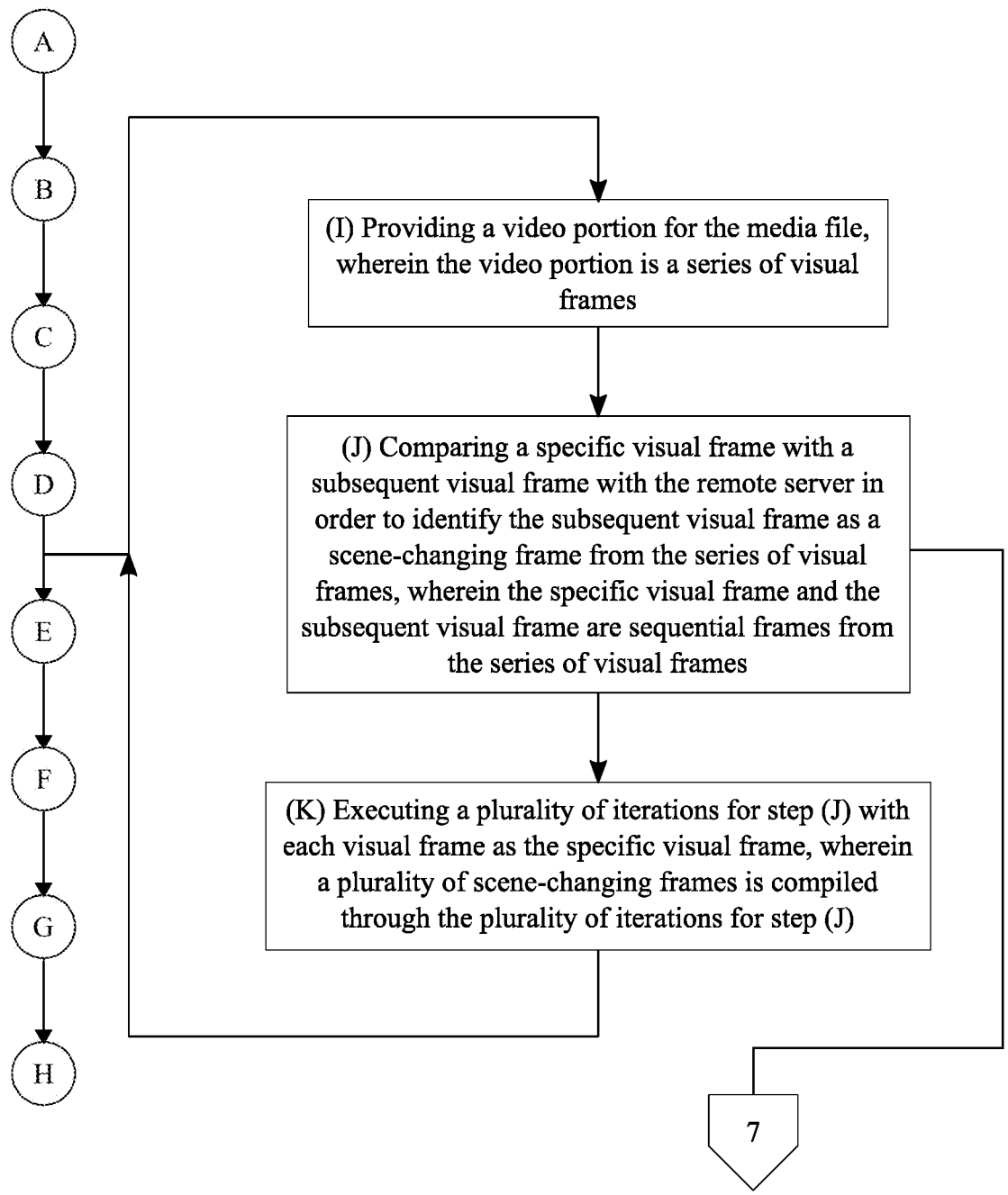
FIG. 6 is a flowchart illustrating the subprocess of generating scene-changing frames from a video portion.
Figure 7:
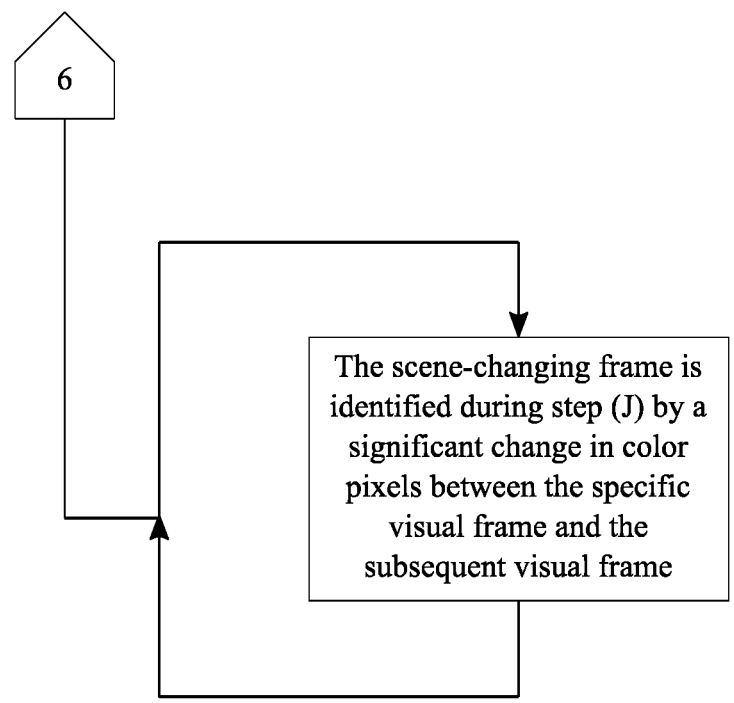
FIG. 7 is a flowchart illustrating the subprocess of identifying scene-changing frames.

While the present invention requires the use of an audio for the generation of a transcription, the present invention further provides a mechanism for integrating related video footage into the generated transcription. To this end, the media file is provided with a video portion, wherein the video portion is a series of visual frames (Step I), as shown in FIG. 6. The series of visual frames is a set of images that are sequentially organized to match with the content of the audio portion. A specific visual frame with a subsequent visual frame is compared with the remote server in order to identify the subsequent visual frame as a scene-changing frame from the series of visual frames, wherein the specific visual frame and the subsequent visual frame are sequential frames from the series of visual frames (Step J). Thus, significant frame-to-frame changes in pixel illumination, which generally correlate with significant content changes in the video portion. Consequently, a plurality of iterations is executed for Step J with each visual frame as the specific visual frame, wherein a plurality of scene-changing frames is compiled through the plurality of iterations for Step J (Step K). By repeating this process, a set of significant frames is captured and made available for subsequent addition into the electronic document. In an exemplary embodiment, as represented in FIG. 7, the scene-changing frame is identified during Step J by a significant change in color pixels between the specific visual frame and the subsequent visual frame. Such a change in most videos and film or visual recording media denote contextual importance.

Figure 8:
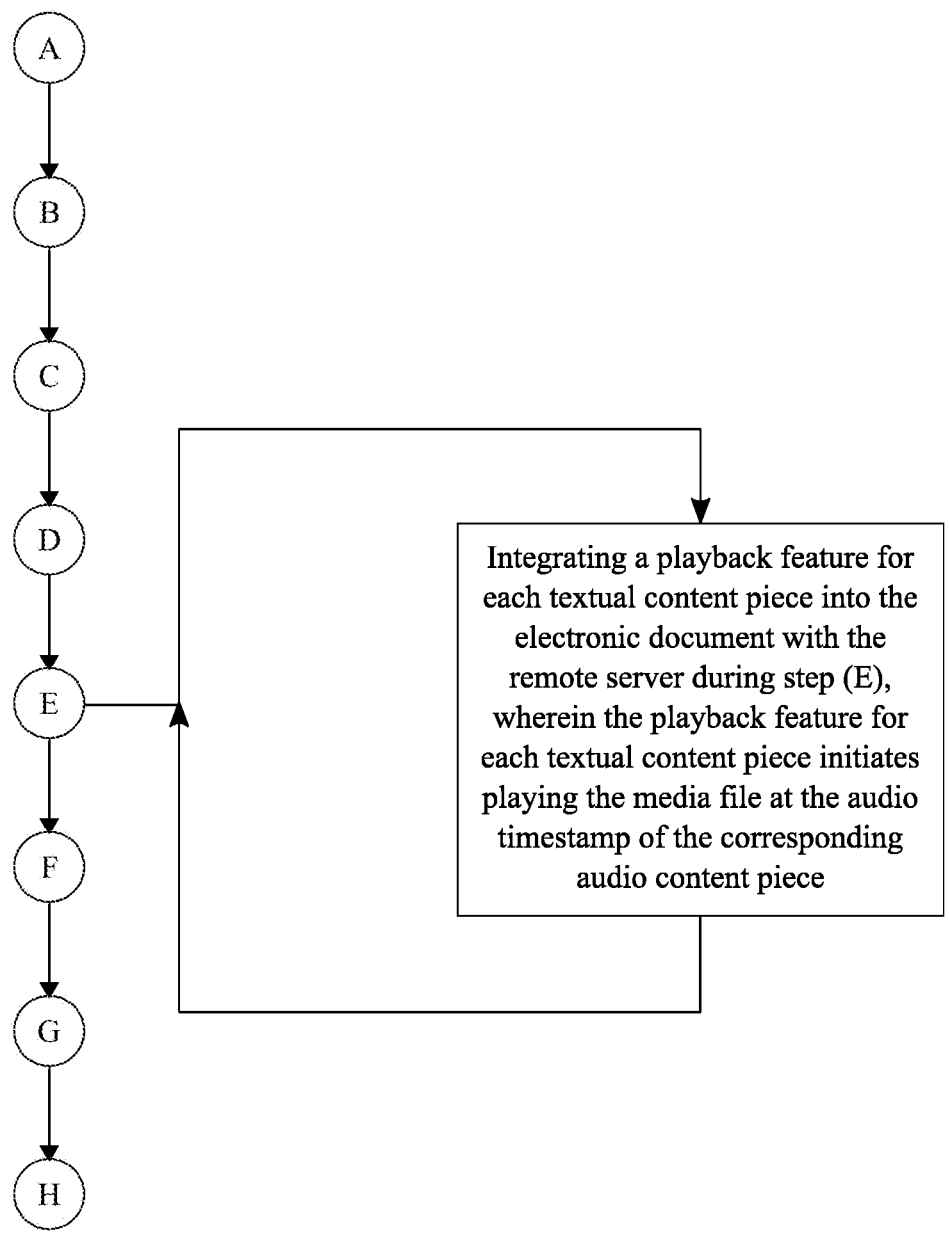
FIG. 8 is a flowchart illustrating the subprocess of replaying content from the media file in conjunction with content of the electronic document.

Upon compilation of the electronic document, the user may desire to utilize the transcription in order to navigate through the initially uploaded or connected media file. To this end, a playback feature for each textual content piece is integrated into the electronic document with the remote server during Step E, wherein the playback feature for each textual content piece initiates playing the media file at the audio timestamp of the corresponding audio content piece, as represented in FIG. 8. The playback feature allows the user to access and control playback of the media file in conjunction with the electronic document.

Figure 9:
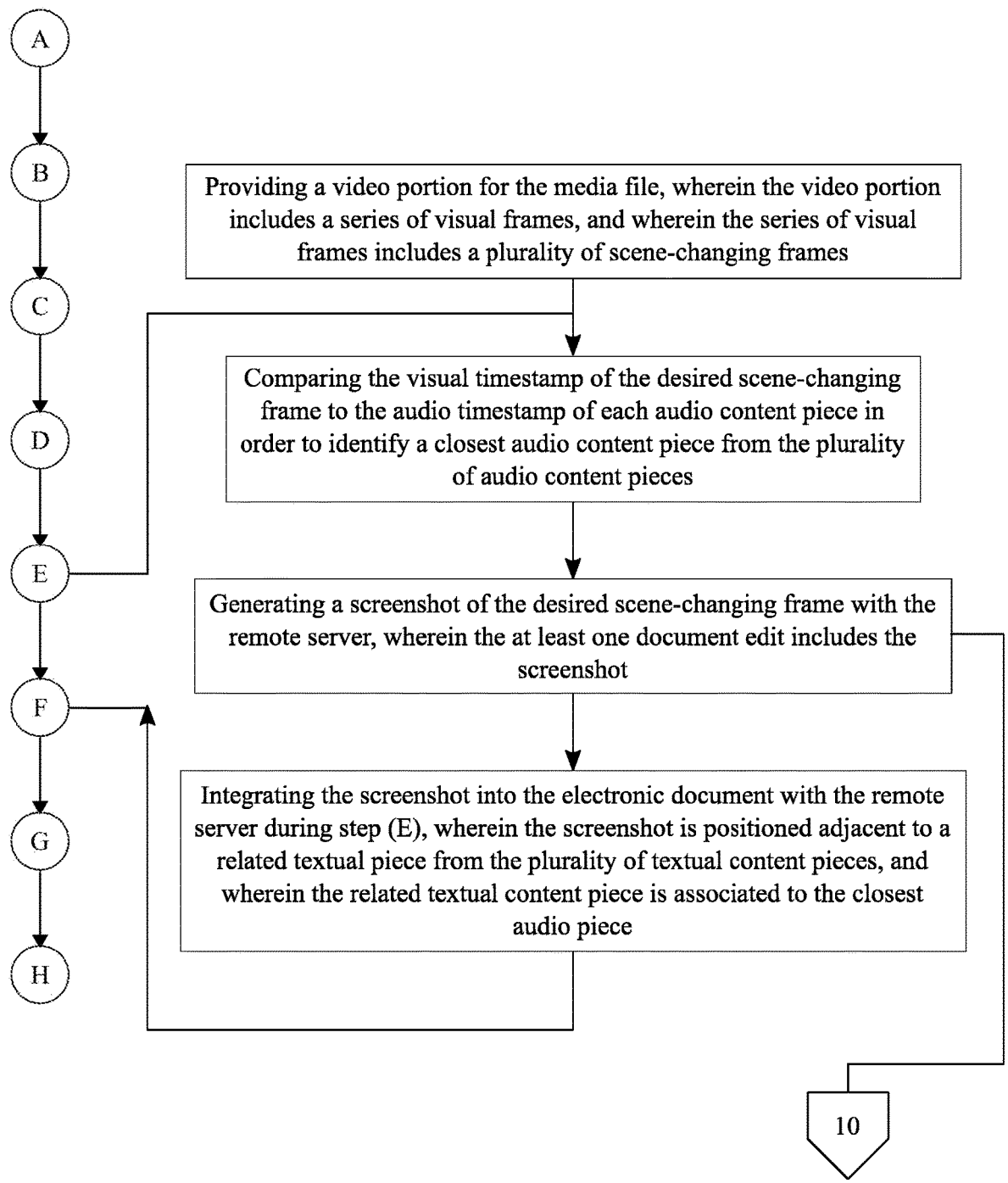
FIG. 9 is a flowchart illustrating the subprocess of appending scene-changing frames into the electronic document.

Uploaded video content may further enhance the electronic document by being added to the electronic document. To this end, a video portion is provided for the media file, wherein the video portion includes a series of visual frames, and wherein each visual frame includes a visual timestamp, and wherein the series of visual frames includes at least one scene-changing frame, as represented in FIG. 9. The series of visual frames is chronologically organized based upon the visual timestamp. The visual timestamp of the scene-changing frame is compared to the audio timestamp of each audio content piece with the remote server in order to identify a closest audio content piece from the plurality of audio content pieces. Thus, the appropriate position for placement of the scene-changing frame is determined by comparison with the audio timestamp of each of the plurality of audio content pieces. A screenshot of the scene-changing frame is generated with the remote server. The screenshot is an organized array of color codes associated with each pixel, the summation of which results in a visual representation of the desired image. Finally, the screenshot is integrated into the electronic document with the remote server during Step E, wherein the screenshot is positioned adjacent to a related textual content piece from the plurality of textual content pieces, and wherein the related textual content piece is associated to the closest audio content piece. In this way, the finalized electronic document is properly organized, with both screenshots and textual content pieces being positioned appropriately within the electronic document.

Figure 10:
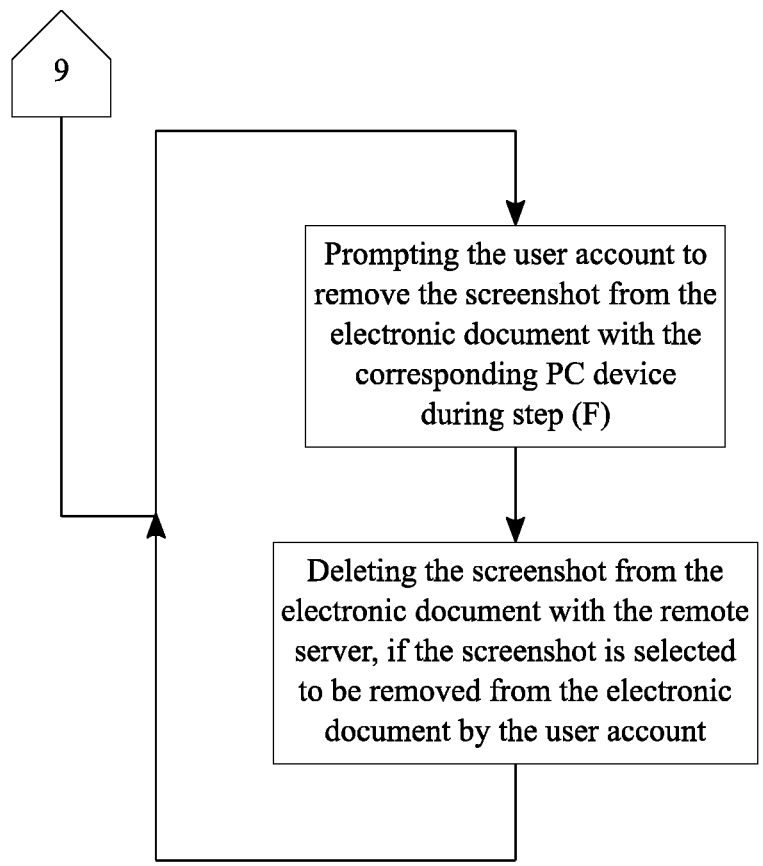
FIG. 10 is a flowchart illustrating the subprocess of removing scene-changing frames from the electronic document.

A user of the present invention may wish to select desirable screenshots and remove other screenshots before completion and publication of the electronic document. To accommodate this desire, the user account is prompted to remove the screenshot from the electronic document with the corresponding PC device during Step F, as represented in FIG. 10. The user account may also simply accept the electronic document as it is automatically assembled. The screenshot is deleted from the electronic document with the remote server, if the screenshot is selected to be removed from the electronic document by the user account. Thus, the user account can control which screenshots are added to the electronic document before completion and publication.

Figure 11:
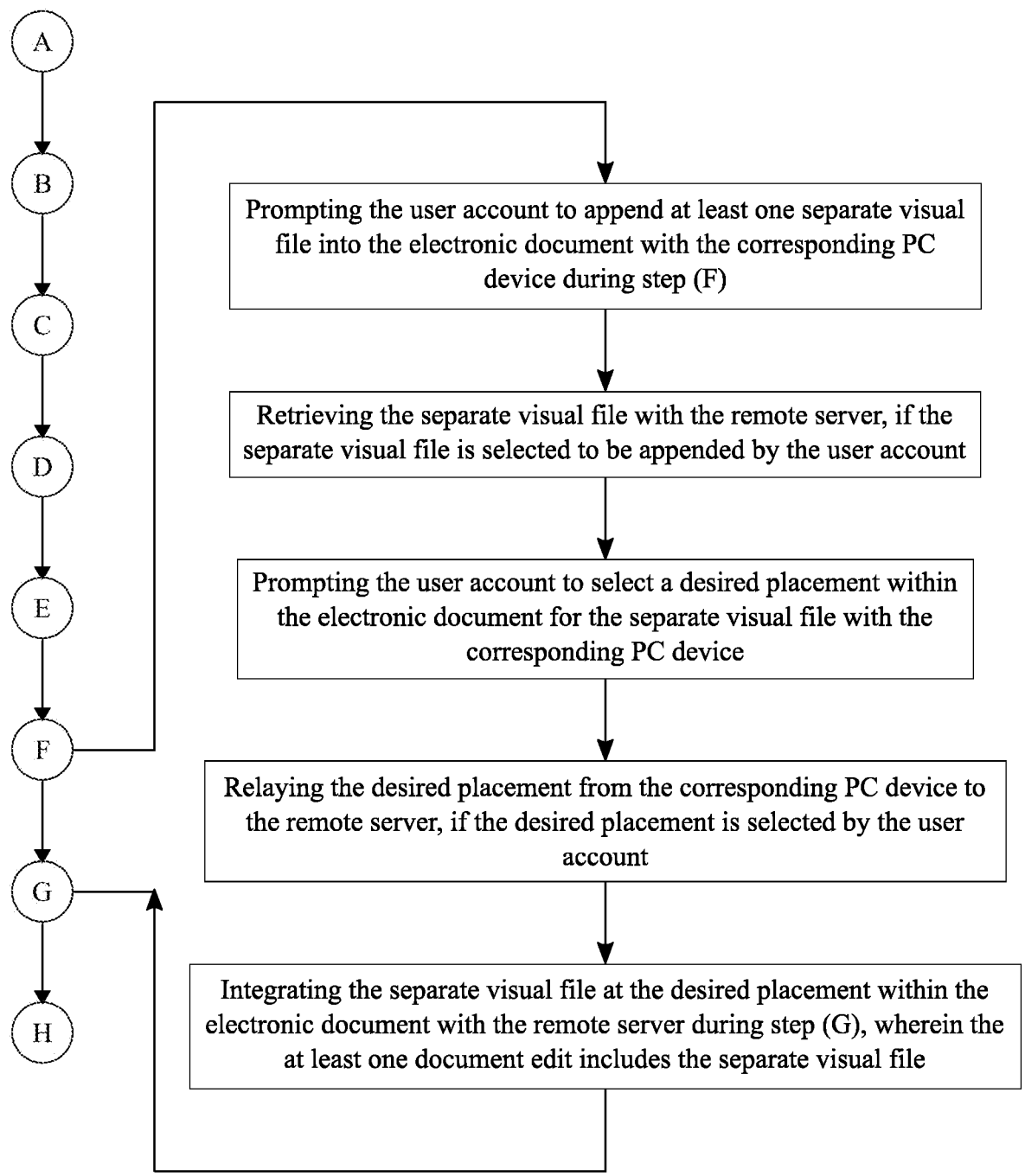
FIG. 11 is a flowchart illustrating the subprocess of manually placing a visual file into the electronic document.

Many users of the present invention may prefer to add their own images and figures to the electronic document. To this end, the user account is prompted to append at least one separate visual file into the electronic document with the corresponding PC device during Step F, as represented in FIG. 11. The separate visual file may be any of a variety of images of different image formats and styles from a variety of sources, including user uploads and website links. Next, the separate visual file is retrieved with the remote server, if the separate visual file is selected to be appended by the user account. Having been retrieved, the separate visual file is now prepared for subsequent integration into the electronic document. The user account is prompted to select a desired placement within the electronic document for the separate visual file with the corresponding PC device. Such an arrangement provides the user with control over the final appearance over the critical content of the electronic document. The desired placement is then relayed from the corresponding PC device to the remote server, if the desired placement is selected by the user account. In this way, the remote server can perform the necessary adjustments for the generation of the electronic document. Finally, the separate visual file is integrated at the desired placement within the electronic document with the remote server during Step G, wherein the at least one document edit includes the separate visual file. Thus, the finalized electronic document is organized for subsequent usage or deployment.

Figure 12:
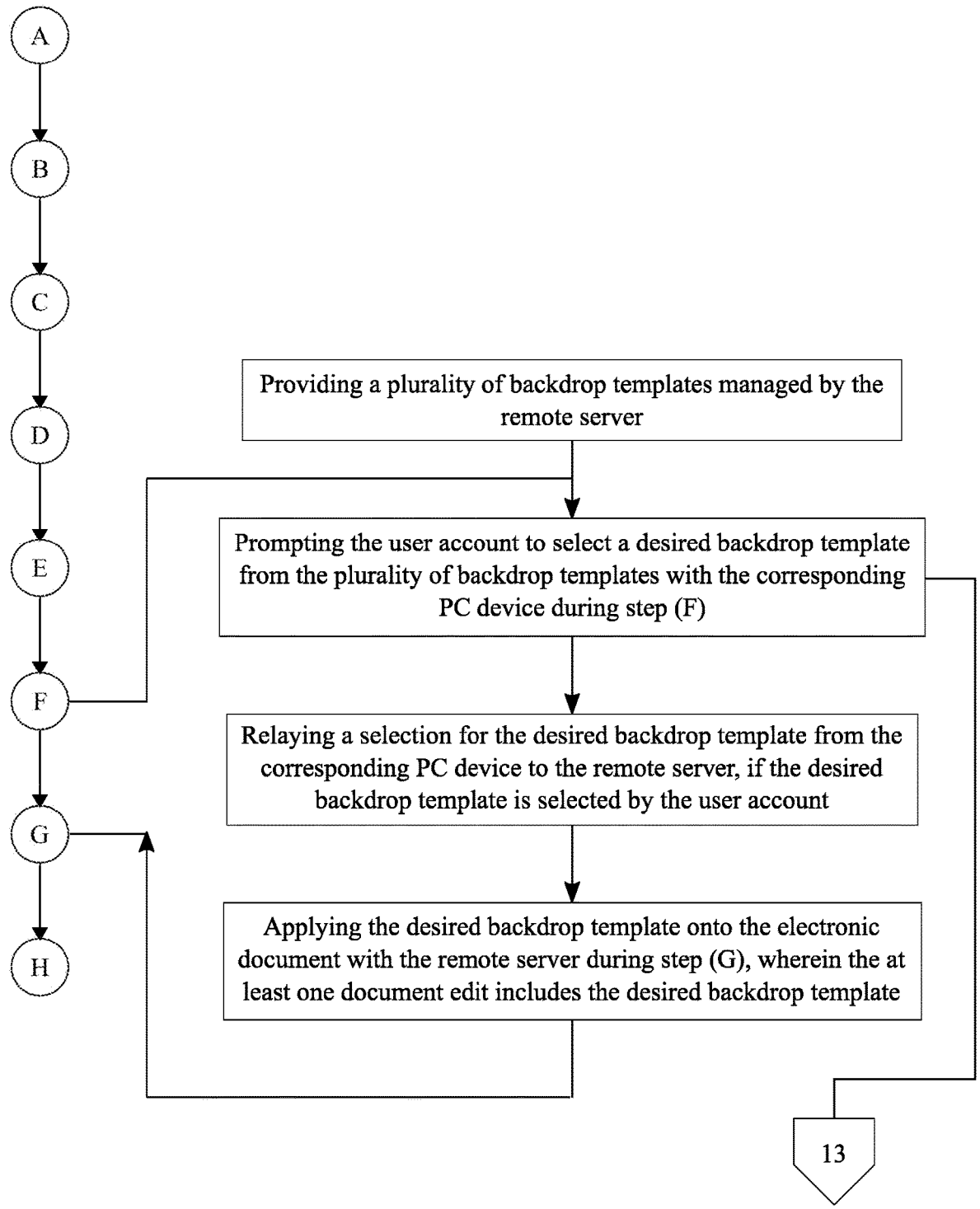
FIG. 12 is a flowchart illustrating the subprocess of selecting a backdrop template.

Customization is a vital part of generating a finalized electronic document. In order to adapt the electronic document to different preferred styles, the present invention is provided with a plurality of backdrop templates managed by the remote server, as represented in FIG. 12. The plurality of backdrop templates is a set of pre-designed visual arrangements that can enhance the presentation of information within the electronic document. The user account is prompted to select a desired backdrop template from the plurality of backdrop templates with the corresponding PC device during Step F. Thus, the user is provided with a variety of functionally decorative designs. A selection for the desired backdrop template is relayed from the corresponding PC device to the remote server, if the desired backdrop template is selected by the user account. In this way, the remote server is prepared with user preferences for appending the desired backdrop template to the electronic document. When the remote server has completed the appending process, the desired backdrop template is applied onto the electronic document with the remote server during Step G, wherein the at least one document edit includes the desired backdrop template. Thus, the electronic document is prepared for completion and subsequent presentation by the user.

Figure 13:
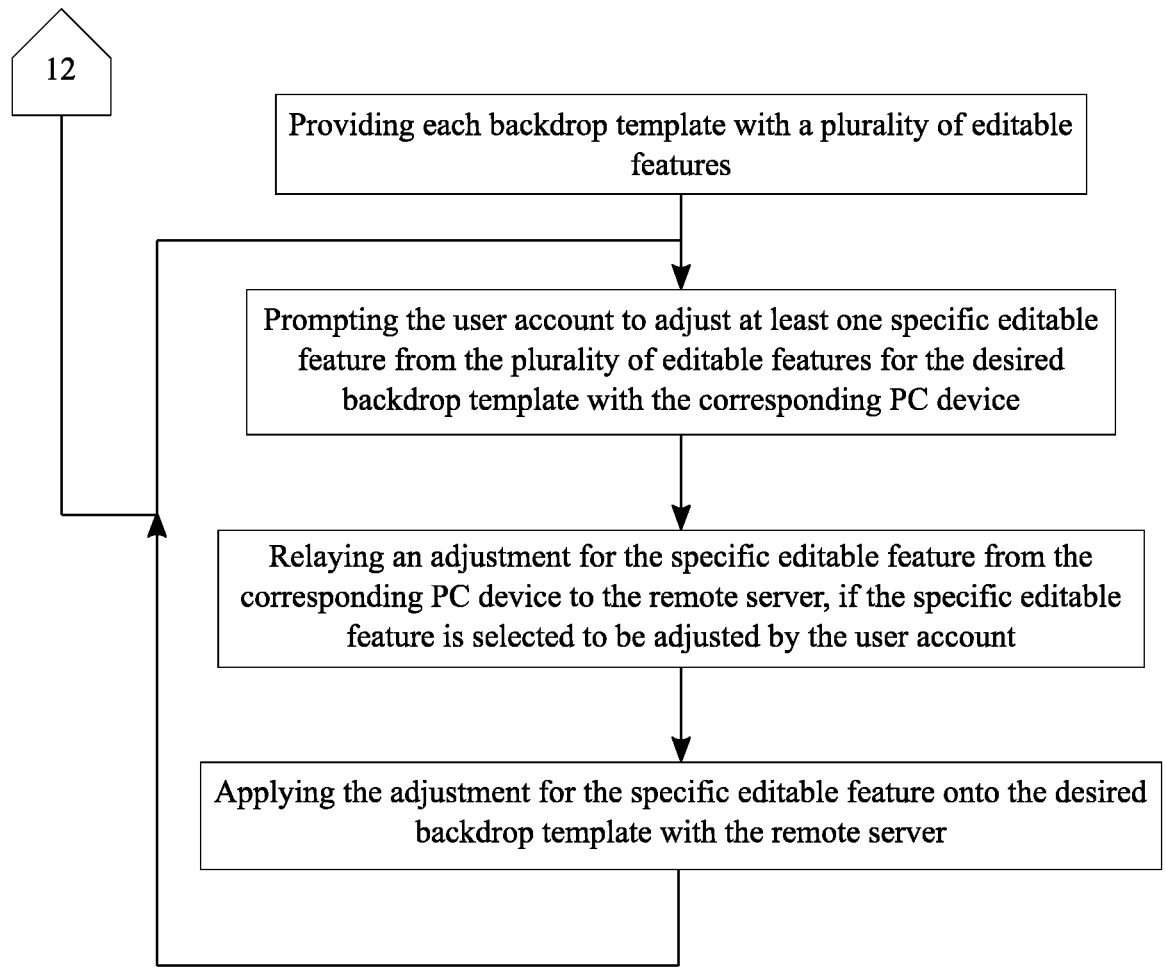
FIG. 13 is a flowchart illustrating the subprocess of editing a backdrop template.

The plurality of backdrop templates may not perfectly fit the user's needs or desires. To address this issue, each backdrop template is provided with a plurality of editable features, as shown in FIG. 13. The plurality of editable features may include, but is not limited to, different font styles, background designs, and page configurations. The user account is prompted to adjust at least one specific editable feature from the plurality of editable features for the desired backdrop template with the corresponding PC device. The specific editable feature may be adjusted with toggles, sliding bars, menus, or a variety of other interaction mechanisms. An adjustment for the specific editable feature is relayed from the corresponding PC device to the remote server, if the specific editable feature is selected to be adjusted by the user account. Thus, the remote server is provided with necessary information to adjust the electronic document to the user's specifications. Finally, the adjustment for the specific editable feature is applied onto the desired backdrop template with the remote server. In this way, the electronic document is completed upon assembly by the remote server.

Figure 14:
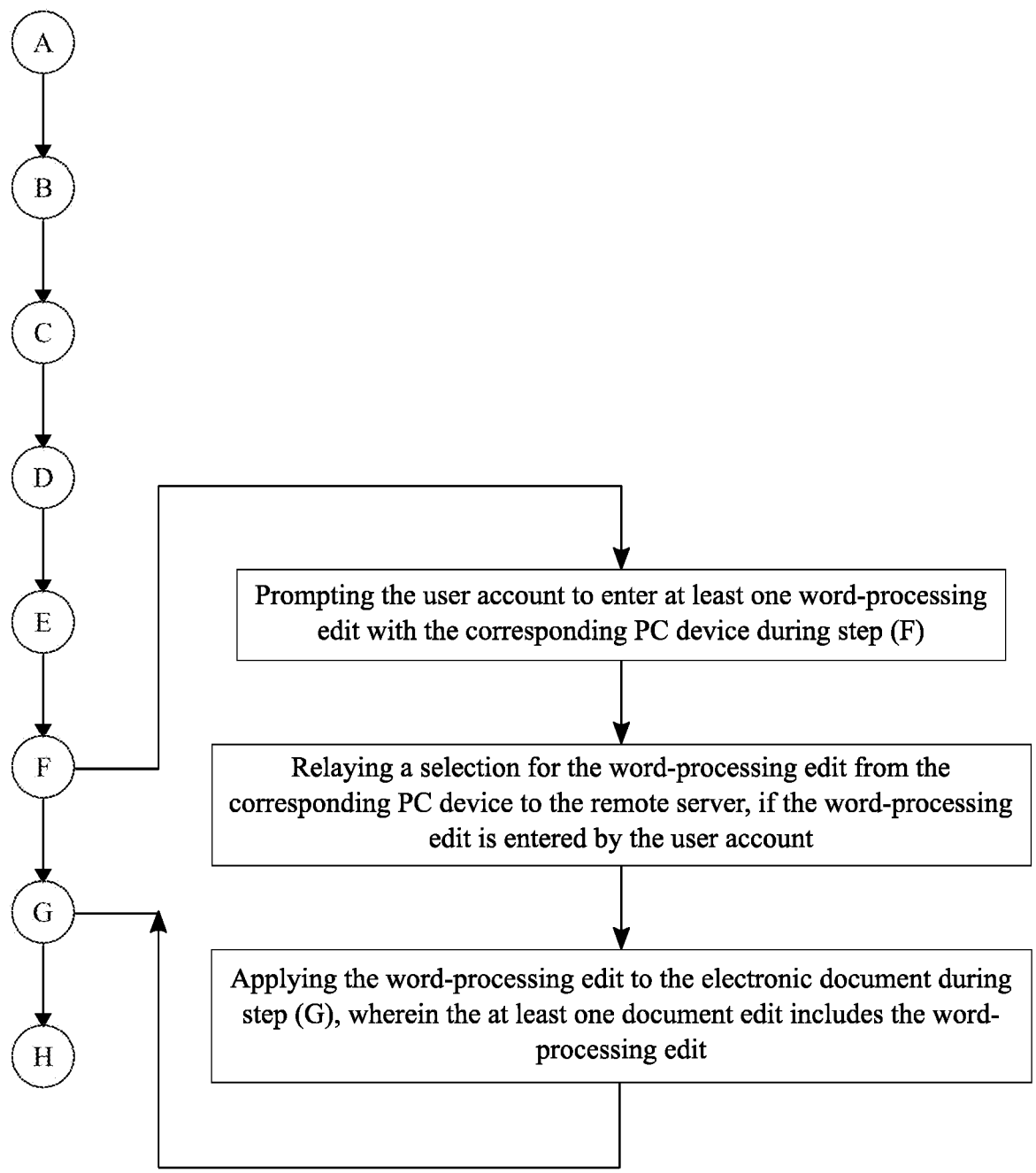
FIG. 14 is a flowchart illustrating the subprocess of interacting with transcribed content upon the electronic document.

The user may be unsatisfied with the textual content provided by the remote server from transcription alone and may further wish to include other supplemental written content. To achieve this, the user account is prompted to enter at least one word-processing edit with the corresponding PC device during Step F, as represented in FIG. 14. The word-processing edit is any addition to the plurality of textual content pieces that provides the document with supplemental information outside the transcribed textual content. A selection for the word-processing edit is relayed from the corresponding PC device to the remote server, if the word-processing edit is entered by the user account. In this way, the remote server is prepared to append the word-processing edit to the electronic document. Finally, the word-processing edit is applied to the electronic document during Step G, wherein the at least one document edit includes the word-processing edit. Thus, the textual content of the electronic document can be edited in accordance to any of the user's desires.

Figure 15:
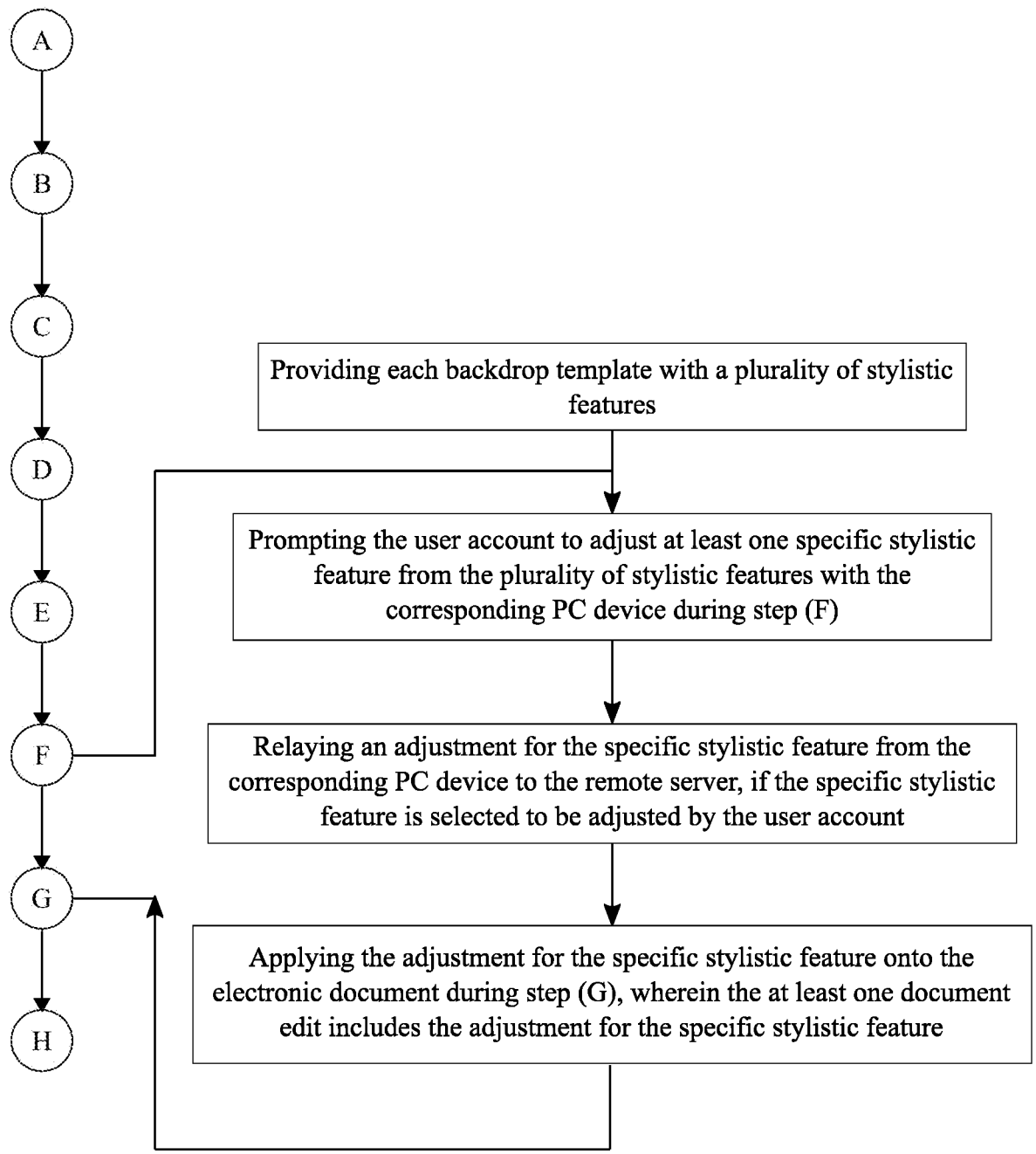
FIG. 15 is a flowchart illustrating the subprocess of applying stylistic features to the electronic document.

Beyond the addition of different backgrounds and textual content, the user may wish to add a variety of different designs to the electronic document. To this end, the electronic document is provided with a plurality of stylistic features. The plurality of stylistic features is a set of visual settings that allow the user to further customize the content of the electronic document. The user account is prompted to adjust at least one specific stylistic feature from the plurality of stylistic features with the corresponding PC device during step F, as represented in FIG. 15. The user can therefore interact with the styling of the electronic document. An adjustment for the specific stylistic feature is relayed from the corresponding PC device to the remote server, if the specific stylistic feature is selected to be adjusted by the user account. In this way, the remote server documents and prepares to adjust the specific stylistic feature on the electronic document. Finally, the adjustment for the specific stylistic feature is applied onto the electronic document during Step G, wherein the at least one document edit includes the adjustment for the specific stylistic feature. In this way, the electronic document is equipped with all of the desired stylistic content from the user, resulting in an electronic document that is optimized for presentation or review by other parties.

Figure 16:
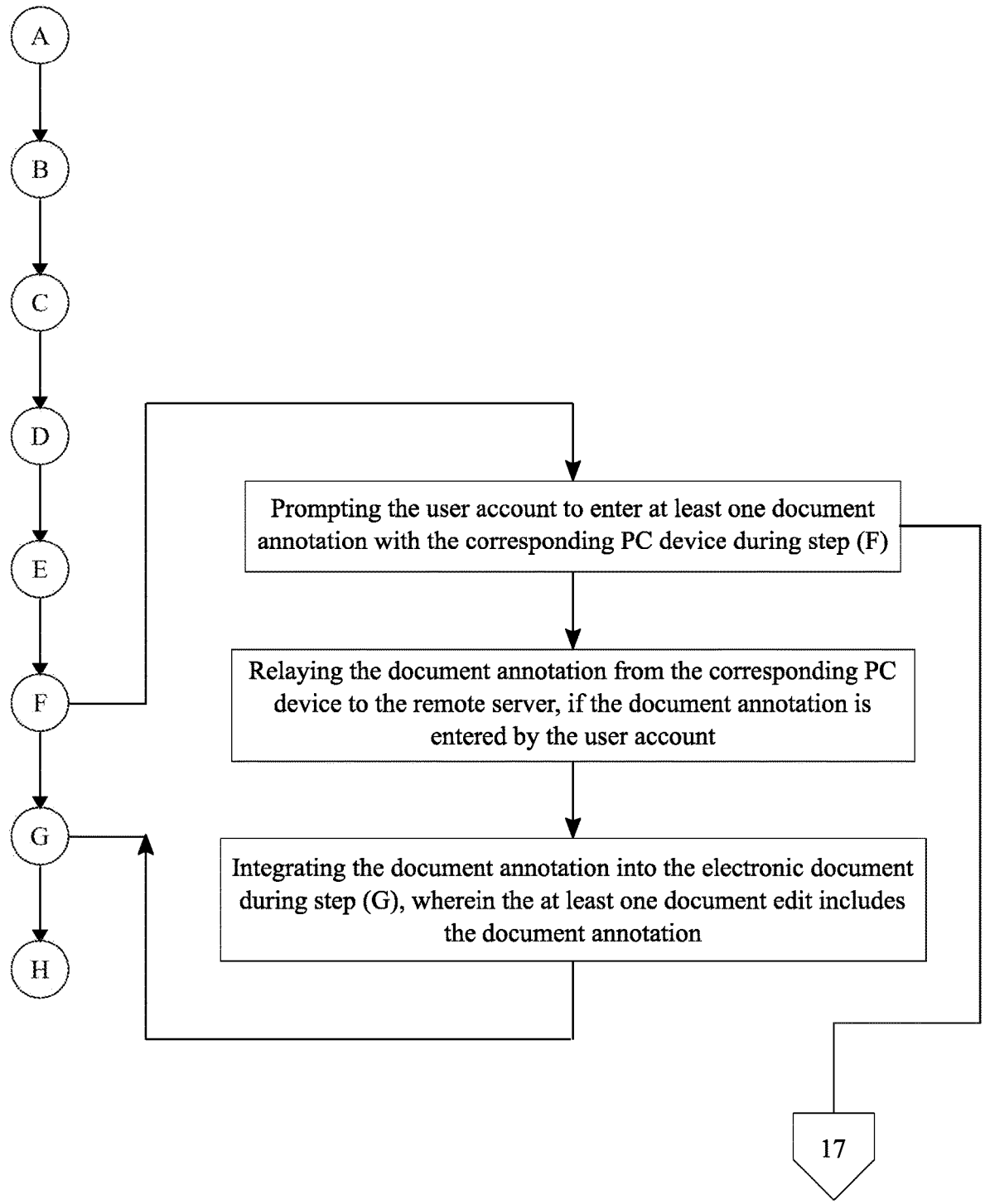
FIG. 16 is a flowchart illustrating the subprocess of selecting a mechanism for annotating the electronic document.

The user may further desire to add annotations to the electronic document to supplement the provided transcription. To address this need, the user account is prompted to enter at least one document annotation with the corresponding PC device during Step F, as represented in FIG. 16. The user can thus insert necessary information into the electronic document before creation of the finalized electronic document. The document annotation is relayed from the corresponding PC device to the remote server, if the document annotation is entered by the user account. In this way, the remote server has access to relevant information to be appended to the electronic document by the user. The document annotation is then integrated into the electronic document during Step G, wherein the at least one document edit includes the document annotation. In this way, the document annotation is applied to the electronic document so that the user can comment on the content of the electronic document without directly affecting the final electronic document.

Figure 17:
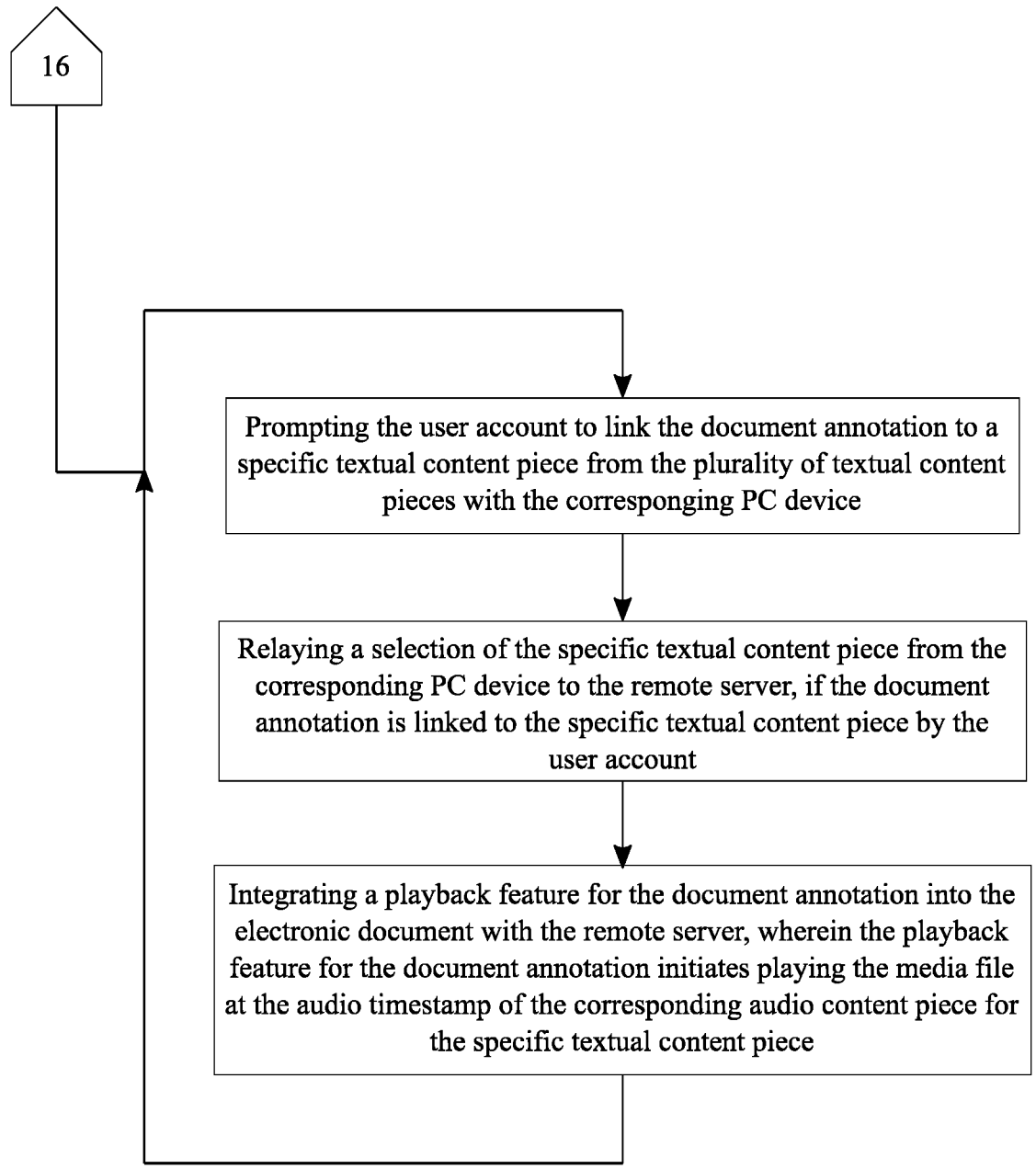
FIG. 17 is a flowchart illustrating the subprocess of linking annotations in the electronic document to the media file.

The at least one document annotation can further be linked back to the original media file. The user account is prompted to link the document annotation to a specific textual content piece from the plurality of textual content pieces with the corresponding PC device, as represented in FIG. 17. By allowing this option, the user indicates the user's preferences with respect to the final electronic document. A selection of the specific textual content piece is relayed from the corresponding PC device to the remote server, if the document annotation is linked to the specific textual content piece by the user account. Thus, the remote server connects the at least one document annotation to the transcribed textual content. Finally, a playback feature for the document annotation is integrated into the electronic document with the remote server, wherein the playback feature for the document annotation initiates playing the media file at the audio timestamp of the corresponding audio content piece for the specific textual content piece. In this arrangement, the annotations which the user wants to be connected to the media file are linked to the appropriate timestamps.

Figure 18:
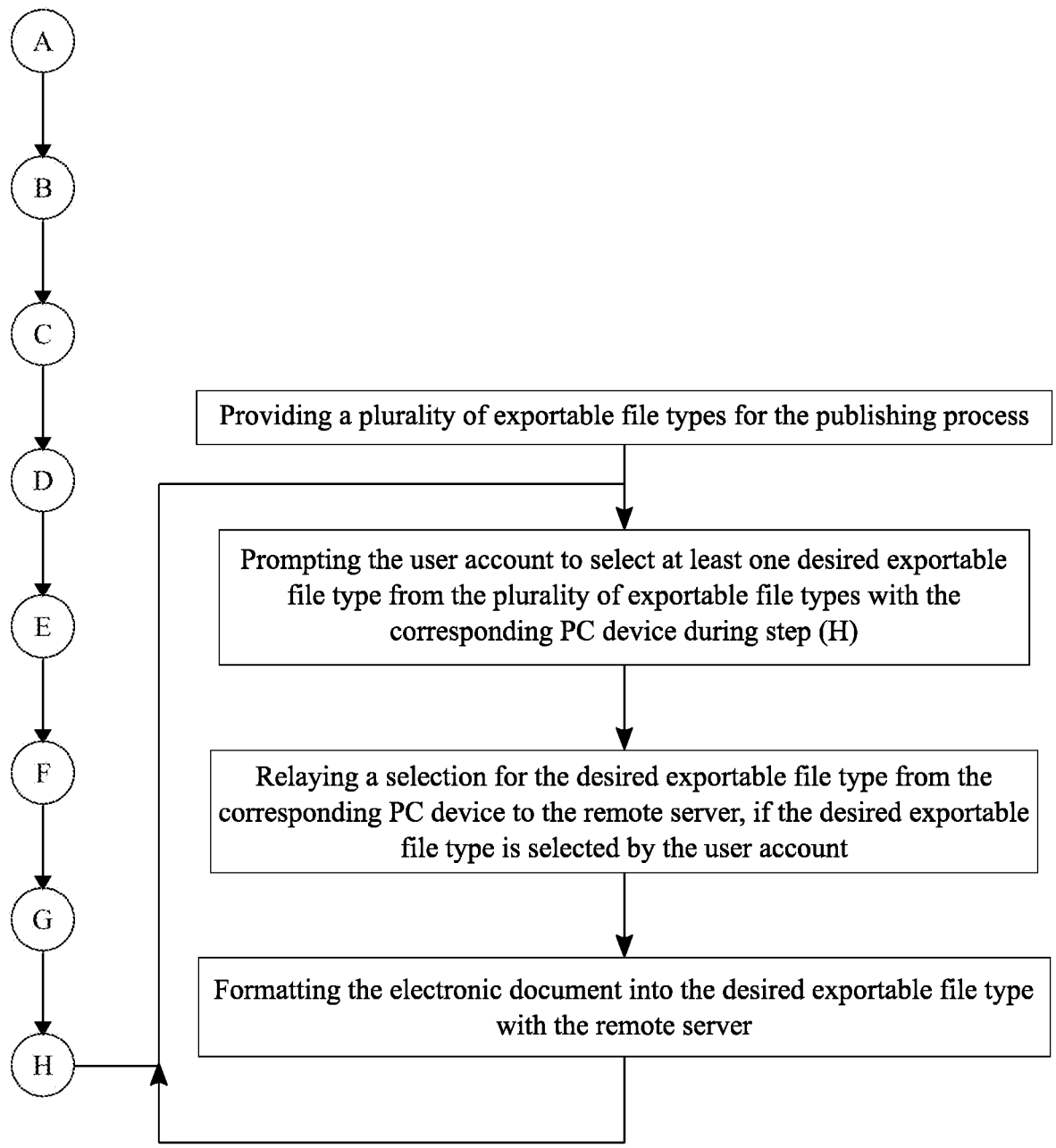
FIG. 18 is a flowchart illustrating the subprocess of selecting a mechanism for publishing the electronic document.

Upon development of the finalized electronic document, the user may need to send the electronic document in a variety of different accessible formats. To accomplish this, the present invention is provided with a plurality of exportable file types for the publishing process, as represented in FIG. 18. The plurality of exportable file types may include any file designation or format that enables transmission of the transcribed textual content and the media file and preferably enables transmission of the desired backdrop template, the specific editable feature, the word-processing edit, the at least one specific stylistic feature, the at least one document annotation, and more. The user account is prompted to select at least one desired exportable file type from the plurality of exportable file types with the corresponding PC device during step H. Thus, the remote server is provided with the preferred file type to export. A selection for the desired exportable file type is relayed from the corresponding PC device to the remote server, if the desired exportable file type is selected by the user account. In this way, the remote server is prepared to output the proper filetype for the electronic document. The electronic document is finally formatted into the desired exportable file type with the remote server. This arrangement provides the user with a desired format for sharing the electronic document.

Figure 19:
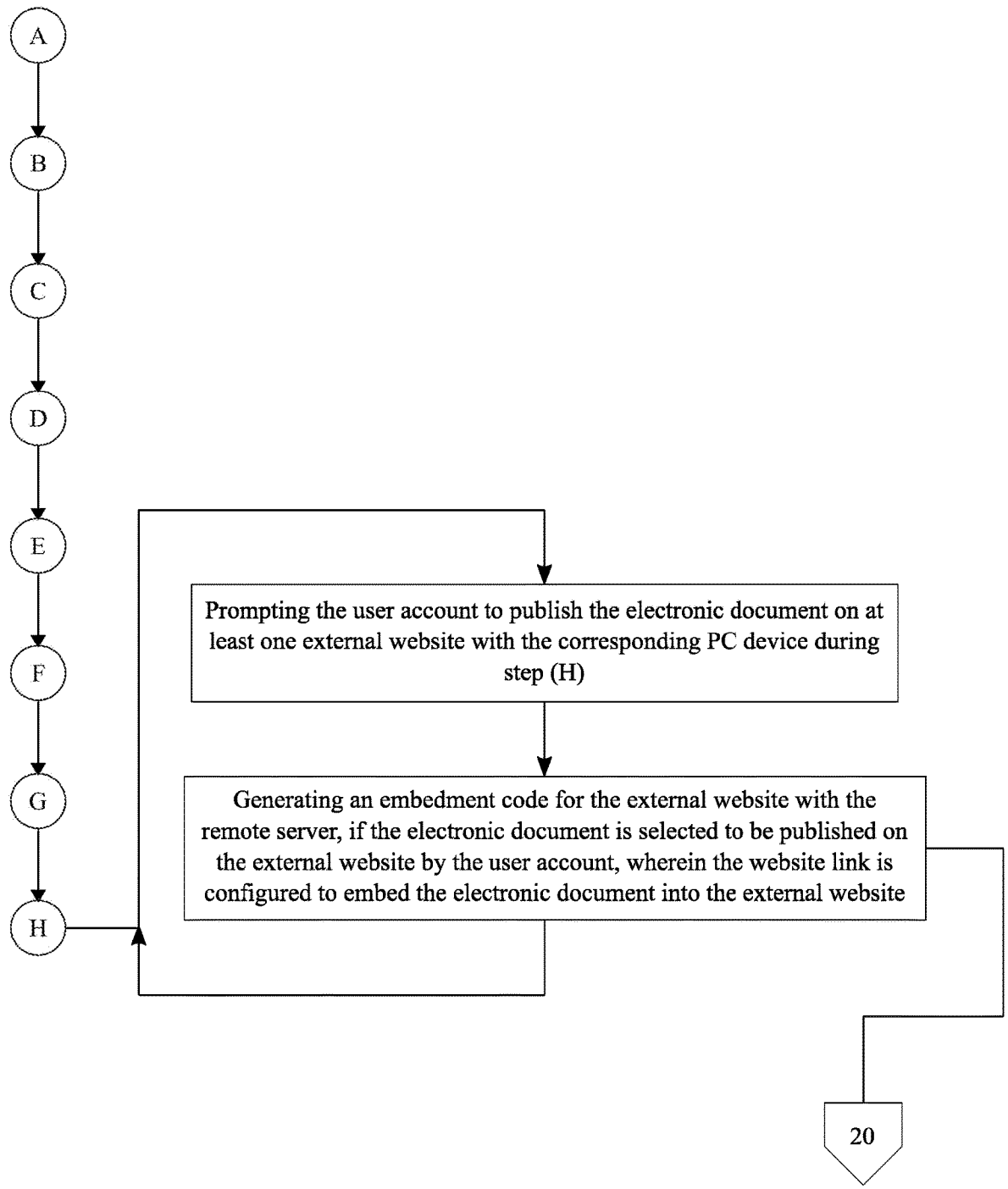
FIG. 19 is a flowchart illustrating the subprocess of publishing or embedding the electronic document onto an external website.

The user may further desire to share the created electronic document on a website, without converting into a compressed or truncated format. To this end, the user account is prompted to publish the electronic document on at least one external website with the corresponding PC device during Step H, as represented in FIG. 19. The user account can therefore express to the remote server preference as to whether the electronic document is published online. An embedment code is generated for the external website with the remote server, if the electronic document is selected to be published on the external website by the user account, wherein the website link is configured to embed the electronic document into the external website. Thus, developers and interested parties can embed an active link to the electronic document on different websites.

Figure 20:
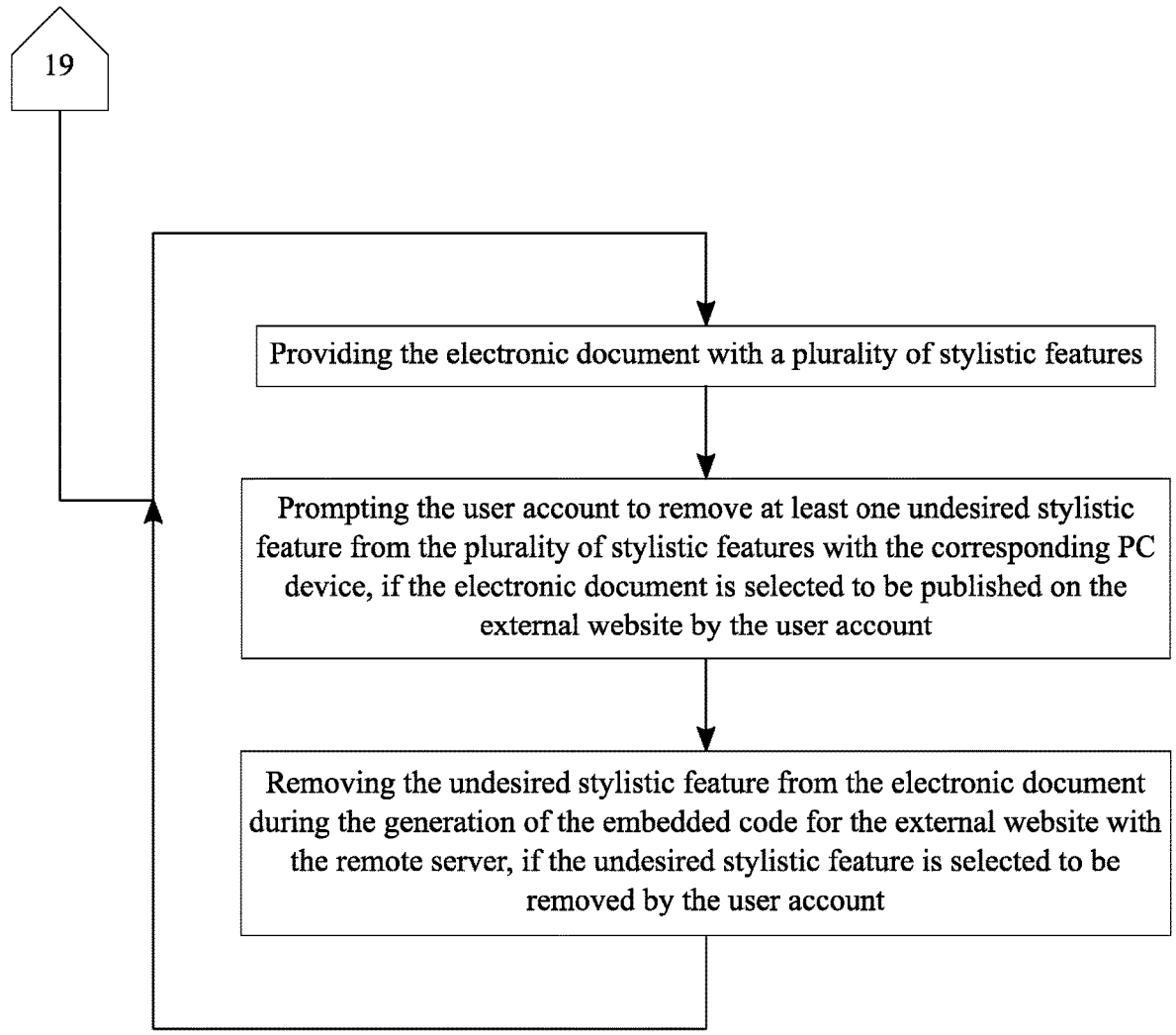
FIG. 20 is a flowchart illustrating the subprocess of stylizing the electronic document.

The user may desire more specific ability to interact with the electronic document upon publication or generation of a link. To this end, the electronic document is provided with a plurality of stylistic features, as represented in FIG. 20. The plurality of stylistic features may include a variety of different shapes, patterns, and designs that enhance the ability of the electronic document to communicate information to interested parties. The user account is then prompted to remove at least one undesired stylistic feature from the plurality of stylistic features with the corresponding PC device, if the electronic document is selected to be published on the external website by the user account. In this way, the user controls which stylistic features are to be included in the embedded link. The undesired stylistic feature is removed from the electronic document during the generation of the embedded code for the external website with the remote server, if the undesired stylistic feature is selected to be removed by the user account. Thus, the user can moderate the content of the embedded or otherwise published content.

Although the invention has been explained in relation to its preferred embodiment, it is to be understood that many other possible modifications and variations can be made without departing from the spirit and scope of the invention as hereinafter claimed.

What is claimed is:
1. A method of contextually converting a media file into an electronic document, the method comprises the steps of:
  (A) providing a user account managed by at least one remote server, wherein the user account is associated with a corresponding personal computing (PC) device;
  (B) retrieving a media file for the user account with the remote server, wherein the media file includes an audio portion;
  (C) parsing the audio portion into a plurality of audible content pieces with the remote server, wherein each audible content piece includes an audio timestamp;
  (D) transcribing the plurality of audible content pieces into a plurality of textual content pieces with the remote server, wherein each textual content piece is associated with a corresponding audible content piece from the plurality of audible content pieces;
  (E) generating an electronic document from the plurality of textual content pieces with the remote server;
  providing a video portion for the media file, wherein the video portion includes a series of visual frames, and wherein each visual frame includes a visual timestamp, and wherein the series of visual frames includes at least one scene-changing frame;

comparing the visual timestamp of the scene-changing frame to the audio timestamp of each audio content piece with the remote server in order to identify a closest audio content piece from a plurality of audio content pieces;

generating a screenshot of the scene-changing frame with the remote server;

integrating the screenshot into the electronic document with the remote server during step (E), wherein the screenshot is positioned adjacent to a related textual content piece from the plurality of textual content pieces, and wherein the related textual content piece is associated to the closest audio content piece;

(F) optionally entering at least one document edit by the user account with the corresponding PC device;

(G) applying the document edit to the electronic document with the remote server in response to the document edit being entered by the user account; and (H) executing a publishing process for the electronic document which is not applied with the document edit with the remote server before step (F) or executing a publishing process for the electronic document which is applied with the document edit with the remote server after step (G).

2. The method of contextually converting a media file into an electronic document, the method as claimed in claim 1 comprises the steps of:

prompting the user account to enter a website link for the media file with the corresponding PC device during step (B); and importing the media file from the web site link with the remote server.

3. The method of contextually converting a media file into an electronic document, the method as claimed in claim 1 comprises the steps of:

prompting the user account to enter an external retrieval site for the media file with the corresponding PC device during step (B); and downloading the media file from the external retrieval site to the remote server.

4. The method of contextually converting a media file into an electronic document, the method as claimed in claim 1 comprises the steps of:

(I) providing a video portion for the media file, wherein the video portion is a series of visual frames;

(J) comparing a specific visual frame with a subsequent visual frame with the remote server in order to identify the subsequent visual frame as a scene-changing frame from the series of visual frames, wherein the specific visual frame and the subsequent visual frame are sequential frames from the series of visual frames; and (K) executing a plurality of iterations for step (J) with each visual frame as the specific visual frame, wherein at least one scene-changing frame is compiled through the plurality of iterations for step (J).

5. The method of contextually converting a media file into an electronic document, the method as claimed in claim 4, wherein the scene-changing frame is identified during step (J) by a significant change in color pixels between the specific visual frame and the subsequent visual frame.

6. The method of contextually converting a media file into an electronic document, the method as claimed in claim 1 comprises the step of:

integrating a playback feature for each textual content piece into the electronic document with the remote server during step (E), wherein the playback feature for each textual content piece initiates playing the media file at the audio timestamp of the corresponding audio content piece.

7. The method of contextually converting a media file into an electronic document, the method as claimed in claim 1 comprises the steps of:

prompting the user account to remove the screenshot from the electronic document with the corresponding PC device during step (F); and deleting the screenshot from the electronic document with the remote server in response to the screenshot being selected to be removed from the electronic document by the user account.

8. The method of contextually converting a media file into an electronic document, the method as claimed in claim 1 comprises the steps of:

prompting the user account to append at least one separate visual file into the electronic document with the corresponding PC device during step (F);

retrieving the separate visual file with the remote server in response to the separate visual file being selected to be appended by the user account;

prompting the user account to select a desired placement within the electronic document for the separate visual file with the corresponding PC device;

relaying the desired placement from the corresponding PC device to the remote server in response to the desired placement being selected by the user account; and integrating the separate visual file at the desired placement within the electronic document with the remote server during step (G), wherein the at least one document edit includes the separate visual file.

9. The method of contextually converting a media file into an electronic document, the method as claimed in claim 1 comprises the steps of:

providing a plurality of backdrop templates managed by the remote server;

prompting the user account to select a desired backdrop template from the plurality of backdrop templates with the corresponding PC device during step (F);

relaying a selection for the desired backdrop template from the corresponding PC device to the remote server in response to the desired backdrop template being selected by the user account; and applying the desired backdrop template onto the electronic document with the remote server during step (G), wherein the at least one document edit includes the desired backdrop template.

10. The method of contextually converting a media file into an electronic document, the method as claimed in claim 9 comprises the steps of:

providing each backdrop template with a plurality of editable features;

prompting the user account to adjust at least one specific editable feature from the plurality of editable features for the desired backdrop template with the corresponding PC device;

relaying an adjustment for the specific editable feature from the corresponding PC device to the remote server in response to the specific editable feature being selected to be adjusted by the user account; and applying the adjustment for the specific editable feature onto the desired backdrop template with the remote server.

11. The method of contextually converting a media file into an electronic document, the method as claimed in claim 1 comprises the steps of:

prompting the user account to enter at least one word-processing edit with the corresponding PC device during step (F);

relaying a selection for the word-processing edit from the corresponding PC device to the remote server in response to the word-processing edit being entered by the user account; and applying the word-processing edit to the electronic document during step (G), wherein the at least one document edit includes the word-processing edit.

12. The method of contextually converting a media file into an electronic document, the method as claimed in claim 1 comprises the steps of:

providing the electronic document with a plurality of stylistic features;

prompting the user account to adjust at least one specific stylistic feature from the plurality of stylistic features with the corresponding PC device during step (F);

relaying an adjustment for the specific stylistic feature from the corresponding PC device to the remote server in response to the specific stylistic feature being selected to be adjusted by the user account; and applying the adjustment for the specific stylistic feature onto the electronic document during step (G), wherein the at least one document edit includes the adjustment for the specific stylistic feature.

13. The method of contextually converting a media file into an electronic document, the method as claimed in claim 1 comprises the steps of:

prompting the user account to enter at least one document annotation with the corresponding PC device during step (F);

relaying the document annotation from the corresponding PC device to the remote server in response to the document annotation being entered by the user account; and integrating the document annotation into the electronic document during step (G), wherein the at least one document edit includes the document annotation.

14. The method of contextually converting a media file into an electronic document, the method as claimed in claim 13 comprises the step of:

prompting the user account to link the document annotation to a specific textual content piece from the plurality of textual content pieces with the corresponding PC device;

relaying a selection of the specific textual content piece from the corresponding PC device to the remote server in response to the document annotation being linked to the specific textual content piece by the user account; and integrating a playback feature for the document annotation into the electronic document with the remote server, wherein the playback feature for the document annotation initiates playing the media file at the audio timestamp of the corresponding audio content piece for the specific textual content piece.

15. The method of contextually converting a media file into an electronic document, the method as claimed in claim 1 comprises the steps of:

providing a plurality of exportable file types for the publishing process;

prompting the user account to select at least one desired exportable file type from the plurality of exportable file types with the corresponding PC device during step (H);

relaying a selection for the desired exportable file type from the corresponding PC device to the remote server in response to the desired exportable file type being selected by the user account; and formatting the electronic document into the desired exportable file type with the remote server.

16. The method of contextually converting a media file into an electronic document, the method as claimed in claim 1 comprises the steps of:

prompting the user account to publish the electronic document on at least one external website with the corresponding PC device during step (H); and generating an embedment code for the external website with the remote server in response to the electronic document being selected to be published on the external web site by the user account, wherein the web site link is configured to embed the electronic document into the external website.

17. The method of contextually converting a media file into an electronic document, the method as claimed in claim 16 comprises the steps of:

providing the electronic document with a plurality of stylistic features;

prompting the user account to remove at least one undesired stylistic feature from the plurality of stylistic features with the corresponding PC device in response to the electronic document being selected to be published on the external web site by the user account; and removing the undesired stylistic feature from the electronic document during the generation of the embedded code for the external website with the remote server in response to the undesired stylistic feature being selected to be removed by the user account.

* * * * *